United States Patent [19]

Sainen et al.

[11] Patent Number: 4,736,324
[45] Date of Patent: Apr. 5, 1988

[54] CENTRALIZED CONTROL METHOD FOR LOOM AND DEVICE THEREOF

[75] Inventors: Tsutomu Sainen; Toshiyuki Sakano; Takeshi Asai, all of Kanazawa; Koyu Maenaka, Mattou, all of Japan

[73] Assignee: Tsudakoma Corp., Kanazawa, Japan

[21] Appl. No.: 799,991

[22] Filed: Nov. 20, 1985

[30] Foreign Application Priority Data

Nov. 20, 1984 [JP] Japan .................... 59-243499
Dec. 4, 1984 [JP] Japan .................... 59-257238
Apr. 2, 1985 [JP] Japan .................... 60-68497
Apr. 9, 1985 [JP] Japan .................... 60-73507
Apr. 9, 1985 [JP] Japan .................... 60-73510

[51] Int. Cl.$^4$ .................... G06F 15/46; D03D 51/00
[52] U.S. Cl. .................... 364/470; 139/1 R; 364/138
[58] Field of Search ... 364/470, 138, 139, 900 MS File; 139/1 R, 1 E, 317, 319

[56] References Cited

U.S. PATENT DOCUMENTS

| | | | |
|---|---|---|---|
| 3,588,832 | 6/1971 | Duncan | 364/900 |
| 4,031,718 | 6/1977 | Luth | 364/470 |
| 4,408,447 | 10/1983 | Sloupensky et al. | 364/900 X |
| 4,525,787 | 6/1985 | Tzuetkov | 364/470 |
| 4,553,569 | 11/1985 | Kimbara et al. | 364/470 X |
| 4,556,945 | 12/1985 | Fry | 364/470 |

Primary Examiner—Joseph Ruggiero
Attorney, Agent, or Firm—Flynn, Thiel, Boutell & Tanis

[57] ABSTRACT

The optimum control conditions for a plurality of looms are simply estimated with the use of a trial loom. Hereby, the plurality of looms are operated under a centralized control method. The looms, even if they vary in their respective characteristics, can be effectively operated by correcting standard control data for controlling the looms in response to variations of the loom characteristics. The present centralized control method can save much labor and time to improve productivity of the looms, by properly eliminating elaborate trial weaving processes.

11 Claims, 15 Drawing Sheets

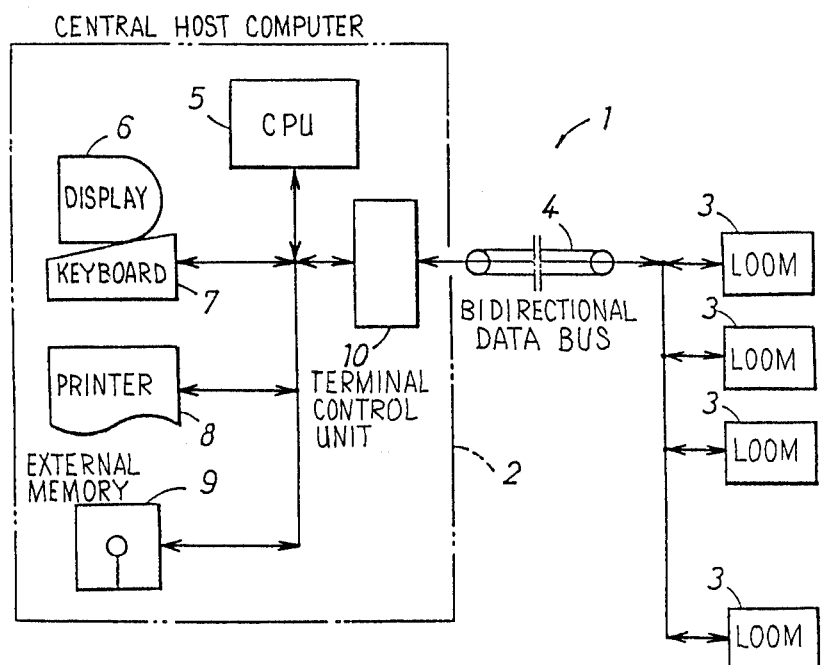
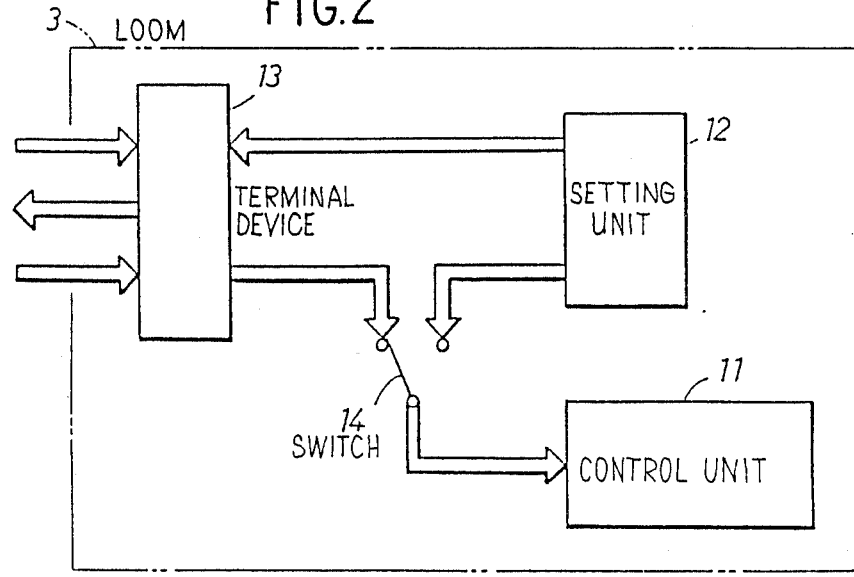

FIG.4

| STYLE NO. | |
|---|---|
| 123456 | |
| RPM | 600 |
| BEATINGS | 50 |
| TENSION | 300 |

CONTROL DATA: RPM, BEATINGS, TENSION

FIG.5

| STYLE NO. | LOOM NO. |
|---|---|
| 123456 | 012 |
| RPM | 550 |
| BEATINGS | 50 |
| TENSION | 300 |

FIG.6

| STYLE NO. | LOOM NO. |
|---|---|
| 111111 | |
| 123456 | |
| 123456 | 012 |
| 123456 | 055 |
| 222222 | |

FIG.12
| THICKNESS | PRESSURE |
|---|---|
| $b_1$ | $P_1$ |
| $b_2$ | $P_2$ |
| $b_i$ | $P_i$ |
| $b_n$ | $P_n$ |
FIG.13
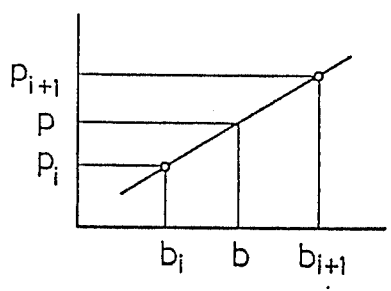
FIG.14
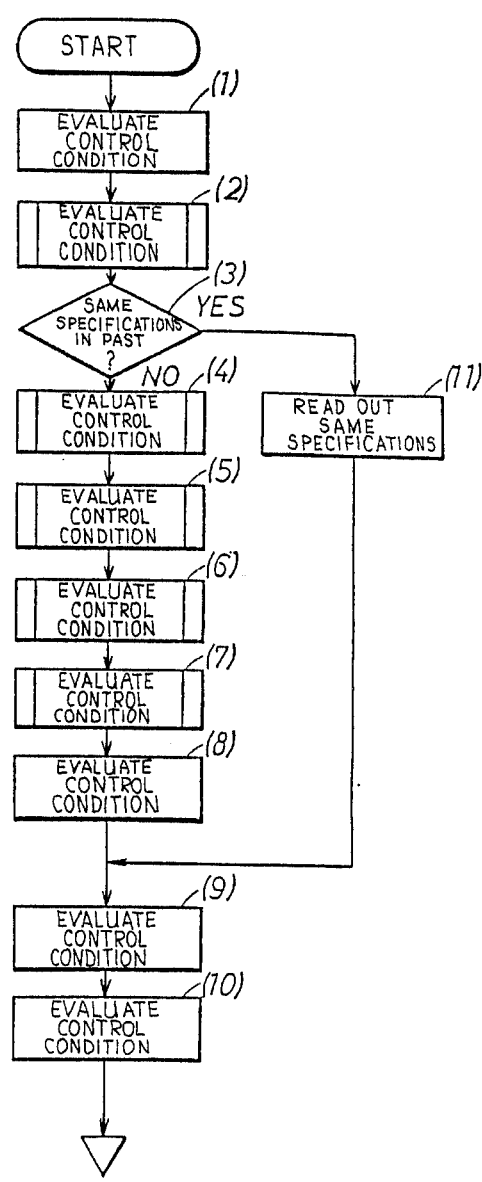

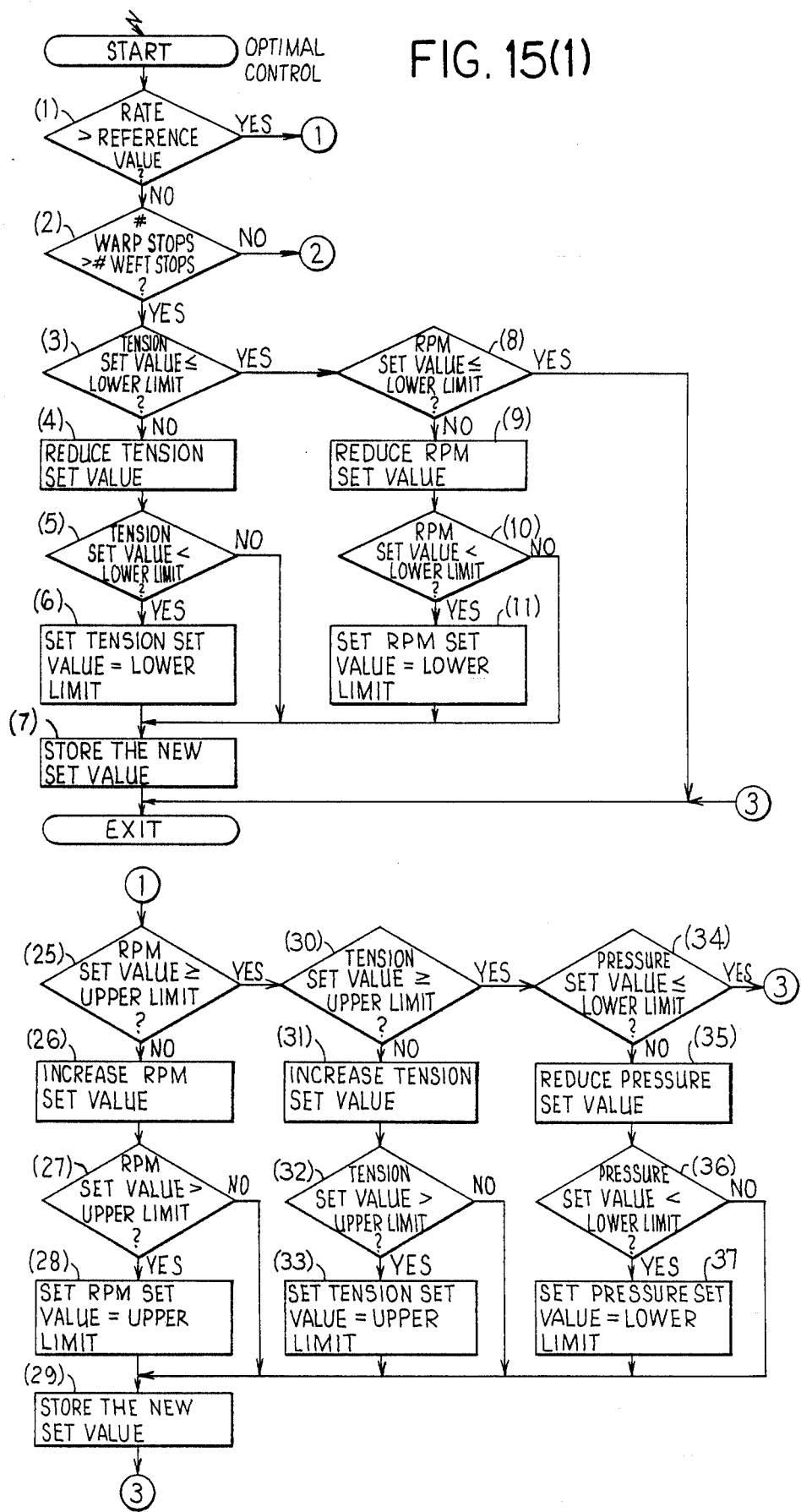

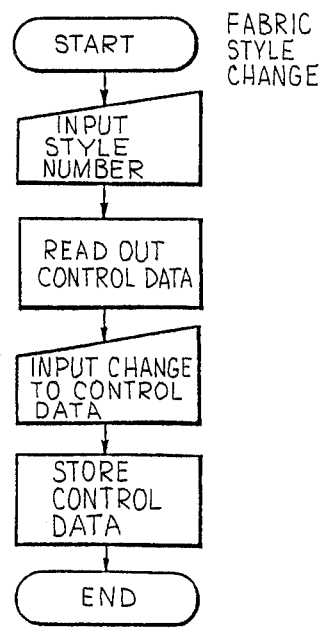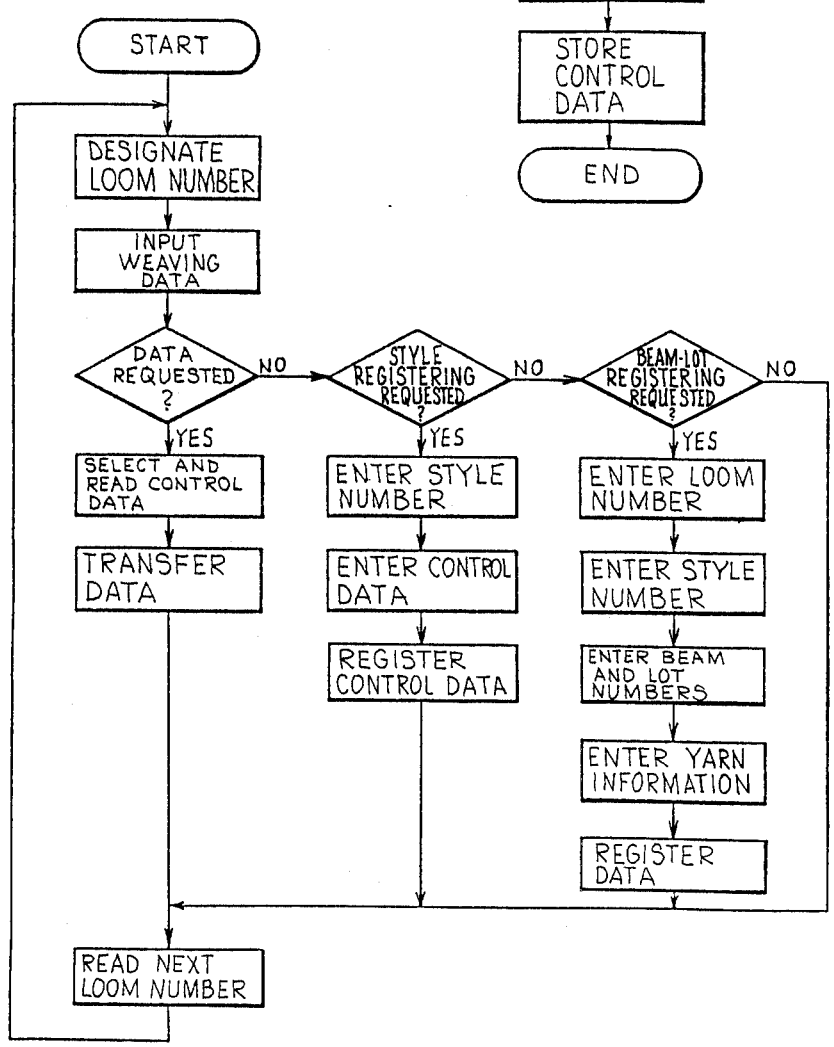

CENTRALIZED CONTROL METHOD FOR LOOM AND DEVICE THEREOF

BACKGROUND OF THE INVENTION

1. Field of the Invention

The present invention relates to a method for centralizing and controlling a plurality of looms, and more particularly to that for preparing weaving conditions by trial weaving, and storing, reading, and transferring control data bearing the weaving conditions after completing the preparation, and further means for changing control data at need after the preparation.

2. Description of the Prior Art

A monitoring system is known up to now as a system to connect many looms with a control computer. The monitoring system collects data of the rates of operations of respective looms and displays them for every loom, but it does not directly control the respective looms.

By contrast, upon actually operating the looms, for example, air jet looms, the respective looms require many control parameters such as a number of RPM of a prime motor of the loom, a number of beatings, tension of a warp yarn, on/off timing of each nozzle, and pressure of air for weft insertion, etc. In an ordinary weaving factory, many looms, not one loom, from several tens to several hundreds thereof, are operated. Moreover, they must often weave the same products. However, provided that the same data are then set for every loom, working efficiency is lowered and requires much time.

So, a centralized control system may be profitably employed, in which a host computer is placed in the center of the factory, and control parameters previously stored in the computer are delivered to control units of respective looms only by entering a product number. Namely, with control parameters for every product stored and kept in the host central computer, a required control data can be immediately sent to the control devices of the respective looms upon starting to weave any fabric.

Then, the recent textile weaving industry intends to obtain highly value-added fabrics, and thus development for yielding new products has been increasing needed. In such a developmental process, the optimum weaving conditions are determined ordinarily with use of one loom as a trial one, while simultaneously changing control conditions of all looms. In this instance, a general-purpose centralized control system as described above may lower rather than raise efficiency of the trial weaving.

In addition, another centralized control device for looms is conventionally known in which control data provided with symbols showing fabric specifications (a number of RPM of a prime motor of a loom, number of beatings, warp tension, and weaving density) are previously registered for every kind of fabrics, and a required control data is delivered to all the looms to permit the looms to be automatically set by designating a symbol showing a fabric specification.

In such prior devices, a data to be registered is in general an average one commonly usable for all the looms. Accordingly, provided that individual looms change in inherent characteristics thereof, the looms can not be operated as desired with the average registered data. Prior art devices suffer from these problems.

In addition, in the prior weaving techniques, upon weaving a new fabric, only a single loom is operated as a testing machine to estimate the optimum control condition while changing for trial weaving many control parameters such for example as a number of RPM of a prime power mover motor of a loom, a number of beatings, warp yarn tensions, on/off timing of each nozzle for weft insertion, etc. In such trial weaving, an operator first provides certain conditions to a loom based on his past experiences and perception, starts weaving, and evaluates the results in succession, in order to estimate the optimum condition with trial and error.

However, such a technique requires much labor and time, as well as a great deal of skill. This is a serious obstacle in quickly supplying woven fabrics to markets based on new specifications since the markets have been recently diversified in demand.

SUMMARY OF THE INVENTION

It is an object of the present invention to provide a method of rapidly estimating the optimum control condition on a trial loom in trial weaving and operating other all looms with a centralized control system based on the estimated optimum control condition.

According to the present invention, switch means for switching a plurality of looms between on-line and off-line operations are provided between control devices and terminals of the looms. In trial weaving, a testing loom is switched off, for which the optimum control (weaving) condition is then evaluated while directly changing various weaving conditions, i.e., control parameters. The resultant optimum control condition is stored in a central host computer, and thereafter other remaining looms are operated based on the estimated optimum control condition. Thus, a centralized control system peculiar to the looms can be achieved.

Another object of the present invention is to provide a centralized control method capable of effectively operating a plurality of looms even if characteristics peculiar to the respective looms are varied.

According to the present invention, standard control data for controlling looms and contents thereof, i.e., peculiar style numbers representative of fabric specifications, are previously stored in a memory of a host computer. These standard control data are corrected in response to variations of characteristics of the respective looms. The corrected peculiar control data are made to include loom numbers besides style numbers, and are stored. The host computer, when a control data having a certain style number is designated, transmits the above control data in a retrieval process, and transmits the control data peculiar to the loom to the loom instead of delivering a standard control data if there is the above control data with the loom number.

With such a method, the host computer transmits control data taken in consideration of the variations, where present, of the characteristics of the looms. Thus, flexible and effective centralized control can be achieved.

Still another object of the present invention is to provide a centralized control method for looms and a device thereof capable of eliminating a trial weaving process requiring much labor and time and improving production efficiency.

Thus, according to the first method of the present invention, part accumulation data are stored beforehand in a memory connected with a host computer serving to control a plurality of looms. With use of fabric specifications entered in the host computer and the past accumulation data read out of the memory, the host computer executes a prescribed arithmetic operation or interpolation operation to evaluate standard set values for loom control.

Moreover, according to the second method of the present invention, past accumulation data are stored beforehand in a memory connected with a host computer serving to control a plurality of looms. With use of fabric specifications entered in the host computer and the past accumulation data read out of the memory, the host computer executes a prescribed arithmetic operation or interpolation operation to evaluate standard set values for loom control, successively compares various operation data (available from the looms starting to be operated in response to operation signals based on the above standard set values) with a plurality of reference values entered therein and previously put in an order of priority to subject the looms to the optimal control, and corrects the above standard set values based on the compared results.

In such a manner, the host computer automatically calculates respective standard set values from past enormous amounts of actual data based on entered fabric specifications, and then respectively delivers the standard set values to corresponding looms to effect centralized control. Accordingly, a trial weaving process can be eliminated to improve production efficiency.

In addition, the evaluated standard set values are self-corrected to provide the optimum operation of the looms. Thus, the looms rapidly respond in the optimum conditions to frequent changes of kinds of fabrics, including unknown fabrics, due to many kinds of fabrics but with small quantities of production.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE INVENTION

FIG. 1 is a block diagram illustrating a first embodiment of a centralized control unit for looms according to the present invention;

FIG. 2 is a block diagram showing an arrangement for switching between on-line and off-line operations;

FIG. 4 is a view showing exemplary standard control data in a second embodiment;

FIG. 5 is a view showing exemplary control data after being corrected;

FIG. 6 shows a style number list;

Figure 15:
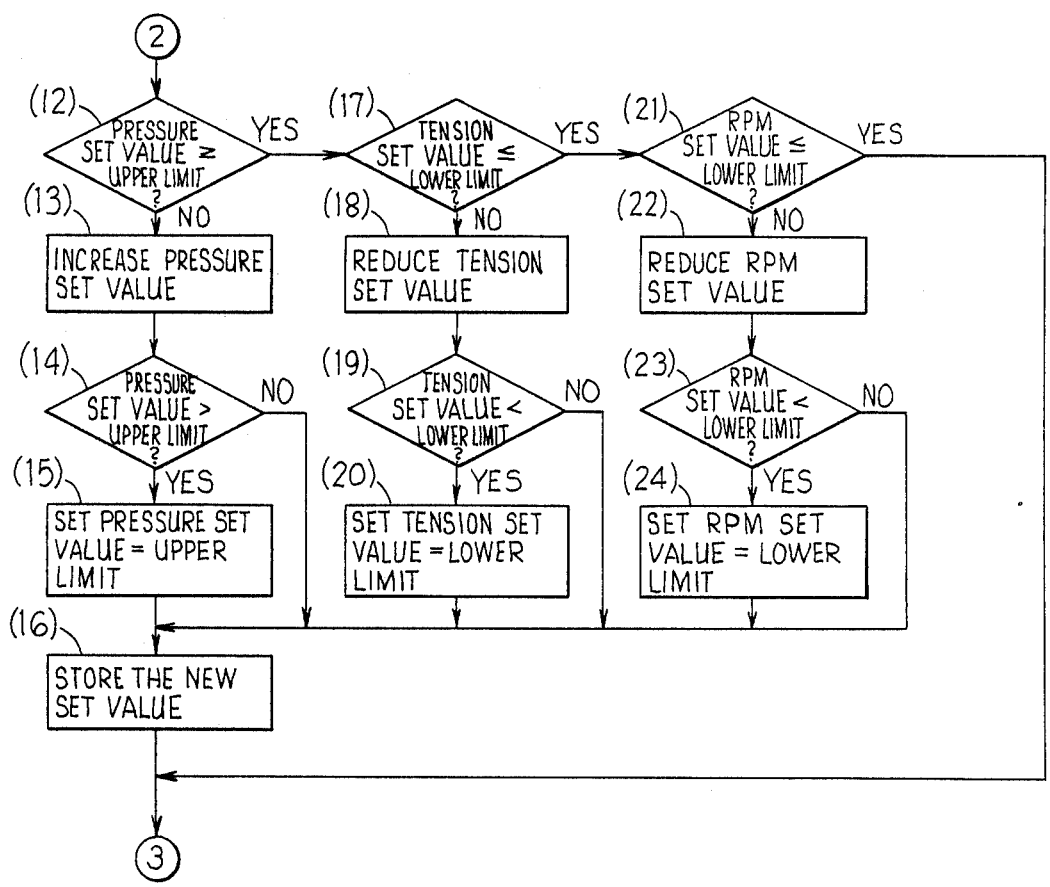
Figure 16:
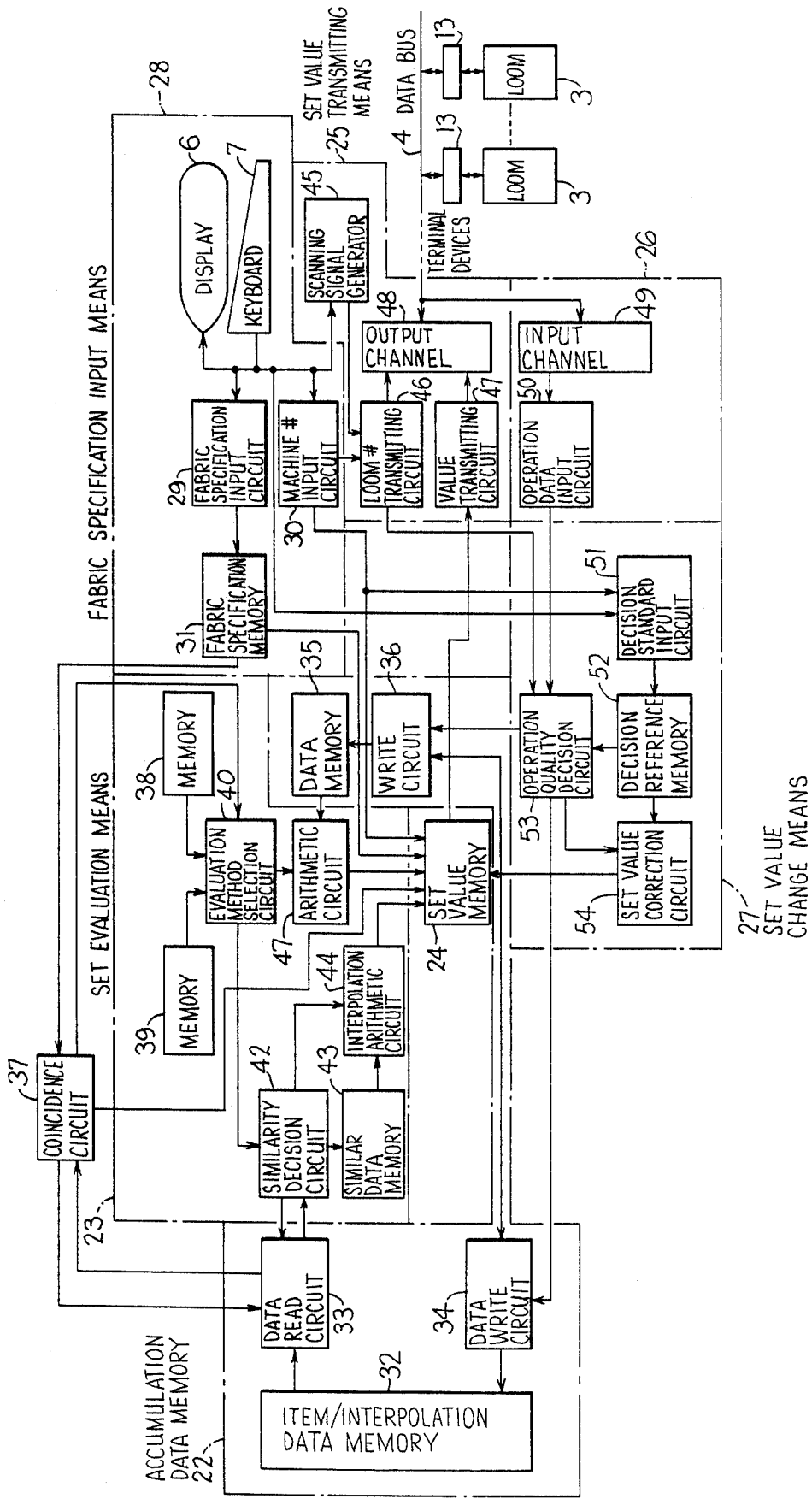
Figure 17:
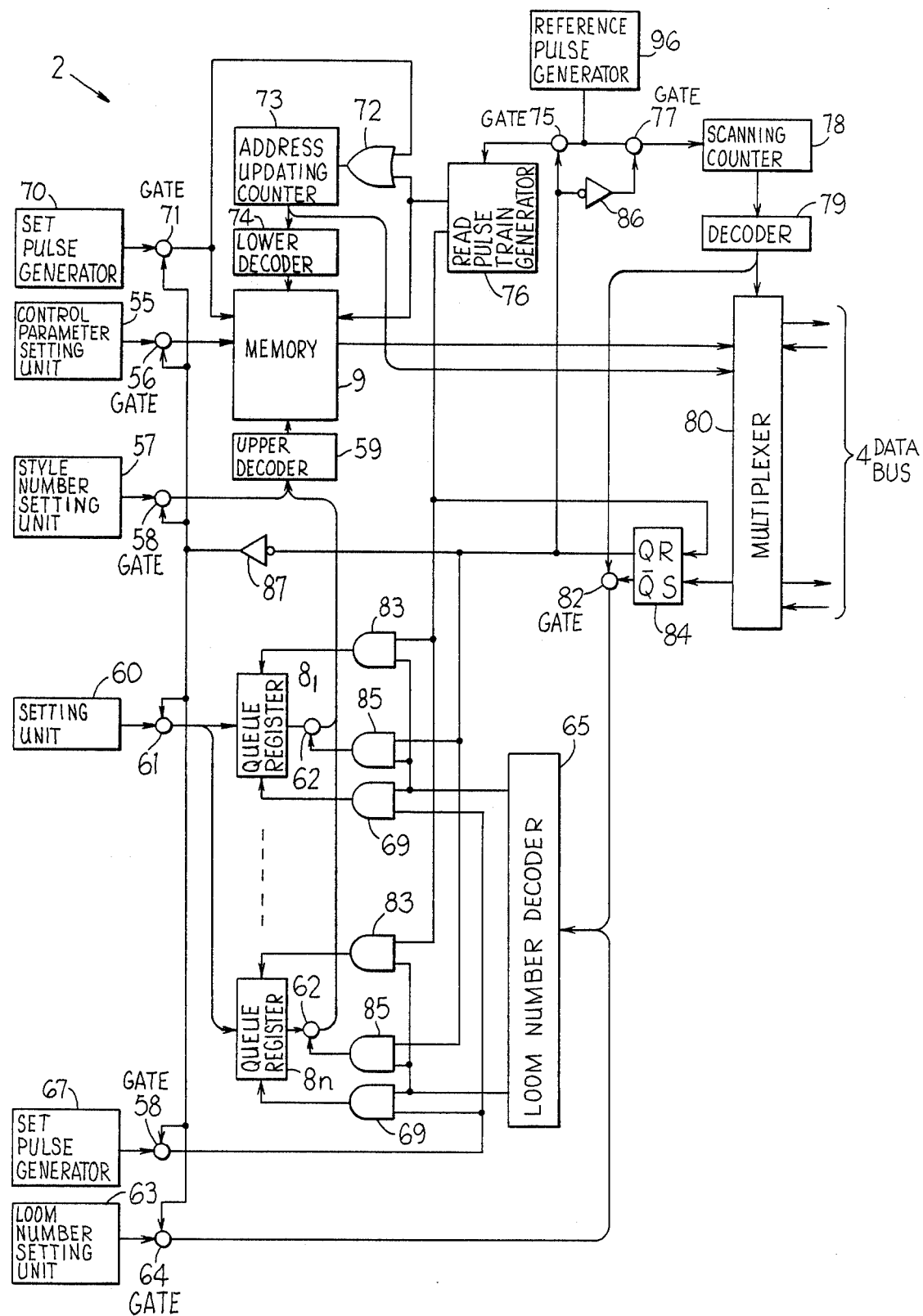
Figure 18:
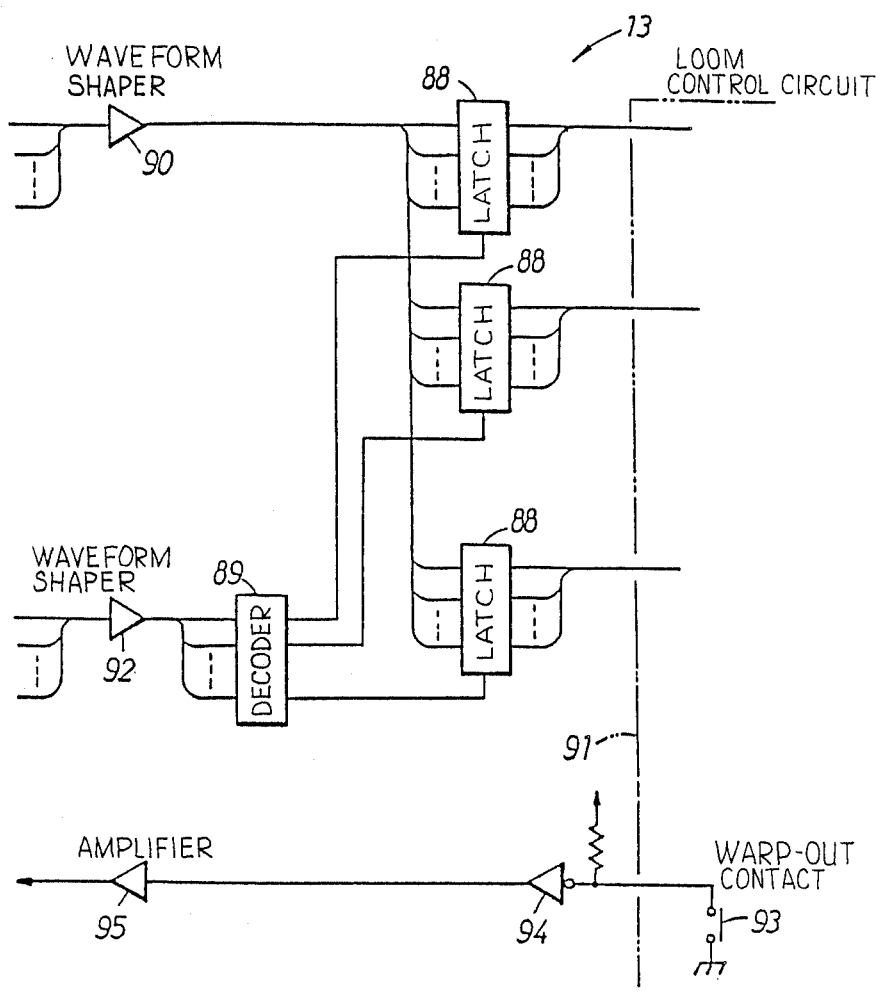
Figure 21:
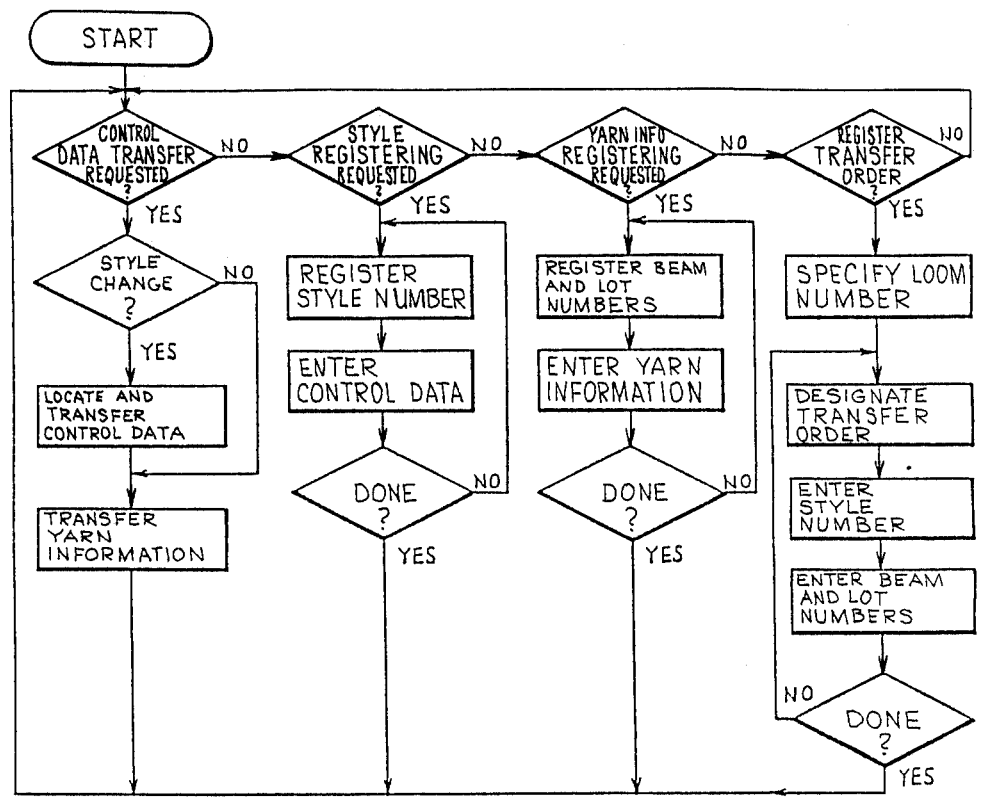

FIGS. 10(a), 10(b), 10(c) and 10(d) are flowcharts for evaluating respective standard set values;

FIGS. 11(a), 11(b), 11(c), and 11(d) are respectively block diagrams showing the functions corresponding to the flowcharts of FIGS. 10(a), 10(b), 10(c) and 10(d);

FIG. 12 is a list showing a relationship among similar data and read from past accumulation data;

FIG. 13 is a view illustrating an interpolation operation;

FIG. 14 is a flowchart showing the whole of the operation of the host computer;

FIG. 15(1) and FIG. 15(2) are flowcharts respectively showing exemplary operations of an optimally controlled loom;

FIG. 16 is a block diagram showing in detail an exemplary centralized control apparatus in the present embodiment;

FIG. 17 is a block diagram of a host computer in a fourth embodiment;

FIG. 18 is a block diagram of a terminal device;

FIG. 19 is a flowchart showing operation of the host computer upon changing kinds of fabrics in a fifth embodiment; and FIGS. 20 and 21 are flow charts of control programs for a centralized control system in the present embodiment.

DESCRIPTION OF THE PREFERRED EMBODIMENT

First embodiment

A first embodiment according to the present invention will be described below, which corresponds to the first object of the present invention and relates to a method of preparing the optimal weaving condition by trial weaving.

First, as shown in FIG. 1, a centralized control apparatus 1 for looms is a main constituent of the present invention and has a central host computer 2 connected with many looms 3 via a bidirectional data bus 4. The host computer 2 includes a display 6 connected bidirectionally to a CPU 5, an input keyboard 7, a printer 8 for recording, an external memory 9, and a terminal control unit 10.

As shown in FIG. 2, each of the looms 3 has therein a terminal device 13 connected with the terminal control unit 10, a setting unit 12 connected with the terminal device 13, and a control unit 11 connectable with the terminal device 13 and setting unit 12 via an on/off line switch 14.

Figure 3:
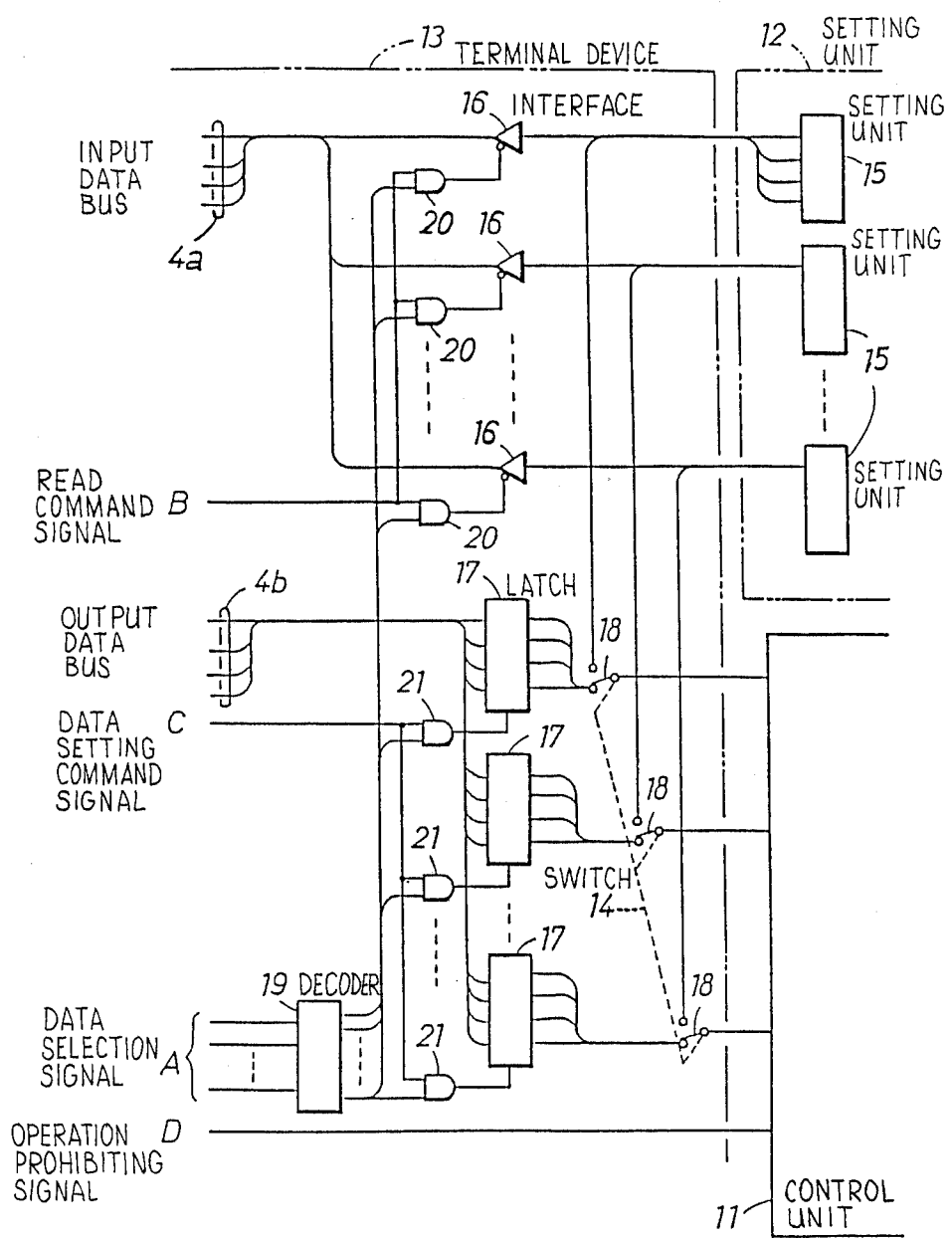
FIG. 3 shows a circuit block diagrams of a respective terminal device and associated setting units.

FIG. 3 shows the interiors of the setting unit 12 and the terminal device 13. The setting unit 12, for example, if an air jet loom, has a plurality of setting units 15 for setting a number of RPM of a prime mover motor, a number of times of yarn beatings, warp yarn tension, on/off timing of each nozzle, and air pressure for weft insertion, etc. These setting units are connected with an input data bus 4a via interfaces 16 in the terminal device 13. Further, an output data bus 4b is connected with latches 17 corresponding in number to the number of the setting units 15. The control unit 11 can be connected with both the setting units 15 and the latches 17 corresponding thereto by the switch 14, i.e., gang switches 18 for switching between on-line and off-line states of the setting unit 12 and the terminal device 13. In addition, a data selection signal A is provided to a common side of input terminals of AND gates 20, 21 via decoder 19. The AND gates 20 are connected with the interfaces 16 on the common output side of the gates, while the AND gates 21 are connected with control input terminals of the latches 17 on the output sides of the gates 21. A read command signal B is entered into the other input terminals of the AND gates 20, while a data setting command signal C is applied to the other input terminals of the AND gates 21. An operation prohibiting signal D is directly entered from the host computer 2 into the control unit 11 via the terminal device 13.

Now, operation of the embodiment 1 will be described below.

First, in trial weaving, the switch 14 (gang switches 18) of the loom 3 for trial weaving is set to an off-line state, and the respective setting units 15 of the setting unit 12 are connected with the cotnrol unit 11 of the loom. With this situation, the respective setting units 15 are operated to set the control conditions, i.e., the control data such as a number of RPM of the prime mover motor required for weaving, a number of beatings, warp yarn tension, on/off timing of each nozzle and air pressure for weft insertion. After setting, trial weaving is repeated on the basis of the respective data until a product with an intended quality is yielded. When the optimal control condition is established during such trial weaving, with the read command signal B entered from the host computer 2 into the terminal device 13, values representative of the optimal conditions of the respective setting units 15 pass through the interfaces 16, and via the input data bus 4a, are stored in an external memory 9 of the host computer 2. Thus, the optimal control data required for weaving are stored in the host computer 2.

In normal weaving thereafter, the switch 14 is switched to an on-line state, whereby the control unit 11 is connected with the latches 17. The optimal control data is read out of the external memory 9 and stored in the respective latches 17 of the loom 3 via the output data bus 4b based on the data setting command signal C and in succession controlled by the data selection signal A. Thereafter, the control unit 11 incorporates therein the optimal control condition data from the latches 17, to thereby control the corresponding loom 3 under the optimal control conditions. Likewise, the optimal control data can be supplied from the external memory 9 to other looms 3.

Thereupon, it is feared that some looms may be very often stopped due to variations of the operation characeristics of the looms even if they are operated under the same weaving conditions. In such a case, the host computer 2 checks the numbers of stop times of the respective looms 3, and issues an operation prohibiting signal D to a loom 3 when the number of the stop times thereof is over a prescribed value, to stop the loom 3, and issues alarms.

Then, the loom 3 is switched to an off-line state, and the control parameters are adjusted by the setting unit 12, and thereafter stored in the host computer 2 as specific data peculiar to the particular loom 3 for the fabric woven at that time.

Accordingly, on and after that time, in applying the product to the particular loom 3, the host computer 2 enters the specific conditions in the control unit 11 instead of the standard data.

This function allows the variations among the looms 3 to be limited to the minimum at the time of corrective operation thereof, and increases productivity of fabrics in a factory.

In addition, it is assumed in this embodiment that no microcomputer is arranged in the terminal device 13 and that data are transmitted in parallel to each other, but provided that any microcomputer is installed in the terminal device 13, the bidirectional bus 4 may be constructed only with one transmission line for serial transmission.

Upon trial weaving, data of the resultant optimal control conditions are stored in the common host computer for all the looms in the one-line state thereof. Thus, all the looms can weave fabrics in their normal weaving under the optimal control conditions with the centralized control system. Such a control form, unlike conventional group control for machine tools, is suited to a factory control form peculiar to weaving factories, and is thus very effective for the improvment of productivity and the development of new products in the weaving factories.

Second embodiment

A Second embodiment of a centralized method for looms according to the present invention will now be described.

The embodiment corresponds to the second object of the present invention, and relates to storage, read, and transfer of the optimal control data after the trial weaving.

In the centralized control apparatus 1 in FIG. 1, the memory 9 in the host computer 2 has stored average or standard control data such as a number of RPM of each loom 3, a number of yarn beatings, and warp yarn tension, etc. These control data are stored together with a unique sytle number representative of fabric specifications.

FIG. 4 shows an example of the standard control data, in which the style number is represented as "123456", for example. In addition, a number of RPM "600", a number of beatings "50", and warp yarn tension "300", etc., provide control data as target values of weaving control for looms.

Moreover, the memory 9 included in the host computer 2 stores, besides standard control data each having a certain style number as shown in FIG. 4, control data which are corrected in consideration of variations of the characteristices of the respective looms 3 corresponding to the style numbers, and which are provided with the style numbers and the respective loom numbers (machine numbers).

FIG. 5 shows an example of control data after correction. A target value of a number of RPM has been here corrected from the standard number of RPM "600"to a peculiar value "550". The corrected control data has the style number "123456" affixed with, e.g., a loom number "012" at, e.g., the final end Kof the style number, whereby the control data is distinguishable from standard control data.

FIG. 6 shows a list of style numbers. Many style numbers are employed in response to fabric specifications. Standard control data are corrected in responce to variations of characteristics of the respective looms 3, each of which has, for example, a three-digit loom number "012" or "055" inserted at the final end thereof.

Here, the standard control data is corrected to provide that peculiar to each loom 3 by a method wherein a control data corresponding to a style number in interest and registered in the host computer is selected, an optionally selected loom is numbered in the control data which is then registered as a control data after the correction, or based on the first embodiment, a certain loom 3 is changed to the off-line state, and while actually operating the loom 3, the optimal value of control data is estimated while changing the control data, and thereafter the loom is returned to the on-line state and the changed control data is read into the host computer 2 in which control data of a fabric in interest and a loom are then numbered and registered.

Figure 7:
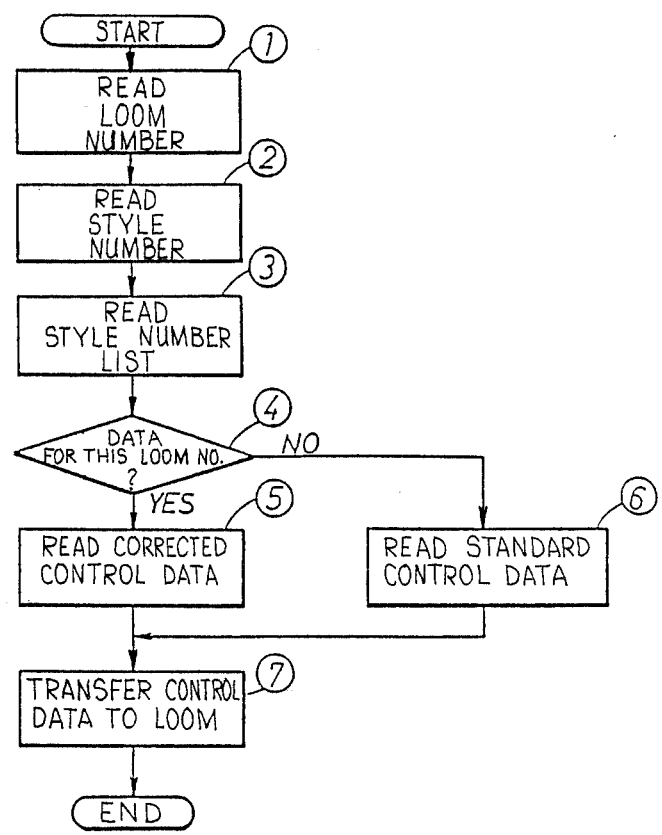
FIG. 7 is a flowchart illustrating operation of a host computer.

FIG. 7 shows a procedure for operating the host computes 2 using the method according to the present invention.

First, in Step 1, a number of a loom intended to be supplied with a control data, e.g., "12" is entered in the host computer 2 after starting the program, and then in Step 2, a style number representative of the control data, e.g., "123456", is entered, and successively in Step 3, a style number list as shown in FIG. 4 is read in. Next, for such style number list, the presence of a data which has the loom number "012" entered in Step 1 in the style number entered in Step 2 is checked for, and if present, the operation advances to Step 5. In step 5, if the style number with the loom number is, for example, "123456012", the CPU 5 reads therein corrected control data as shown in FIG. 4. By contrast, if the result in Step 4 is no, i.e., if the style number with the loom number described above has been not registered, the operation branches of Step 6, in which the host computer 2 reads in a control data having the concerning style number, i.e., a style number as shown in FIG. 6 "123456". Data contents at this time is of the standard control data as shown in FIG. 4.

Thereafter, the operation proceeds to Step 7, and the control data read in by the host computer 2 in Step 5 or 6 is transferred to the loom 3. Thus, a series of the program steps are completed.

By this operation, the control data peculiar to the particular loom 3 is transmitted to the loom 3 which can weave a fabric under the optimal condition based on the control data trasmitted thereto.

The control data peculiar to a loom which can not be operated satisfactorily with the standard control data due to variations of the characteristics of the looms is automatically transferrd to the particular loom instead of the standard control data. Accordingly, with the present invention, flexible centralized control is made possible without deteriorating the rates of operations of a plurality of looms even if there are variations in characteristics of the individual looms.

Third embodiment

A third embodiment of a centralized control system for looms according to the present invention will now be described.

This embodiment corresponds to the third object of the present invention, and concerns in particular a method for quickly preparing new control data for new fabric specifications such for example as a warp yarn total number, a number of weft yarn beating times, yarn kinds, thickness, and weaving conditions, and concerns a device thereof.

Figure 8:
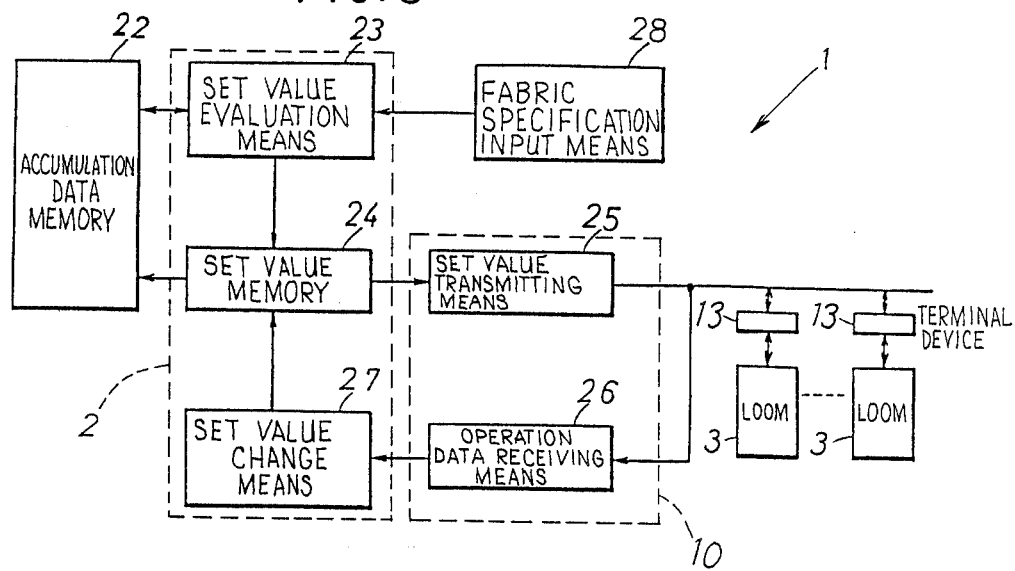
FIG. 8 is a block diagram showing a function of third embodiment.

First, FIG. 8 illustrates the first centralized control apparatus 1 as a functional block daigram in relation to the present embodiment. The host computer 2 serves as a center for centralizing and controlling a plurality of looms 3. The host computer 2 has the same functions as those of set value evaluation means 23, a set value memory 24, and set value change means 27. A keyboard 7 and a display 6 such as a CRT constitutes fabric specification input means 28 for entering fabric specifications. Further, an accumulation data memory 22 such as a floppy disk is connected as an external memory with the host computer 2. In addition, the plurality of the looms 3, being control targets, utilze a terminal control unit 10 as a communication interface having a bidirectional data bus 4, set value transmitting means 25, and operation data receiving means 26.

Now, operation of the centralized control apparatus for example in weaving a new specification fabric is described.

Figure 9:
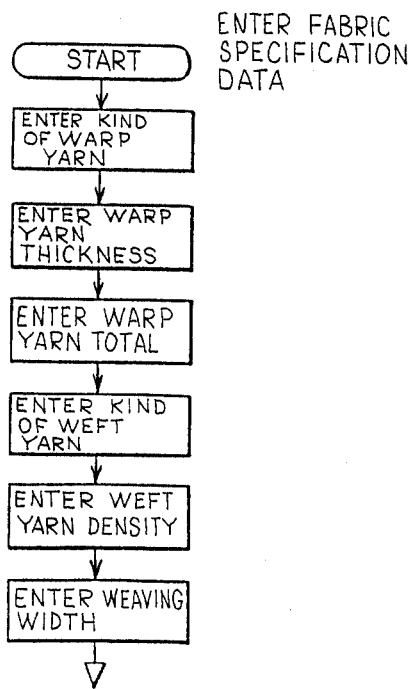
FIG. 9 is a flowchart showing a procedure for entering fabric specifications in the host computer.

First, watching the display 6, fabric specifications are entered interactively in the host computer with use of the keyboard 7. FIG. 9 shows a procedure for entering the fabric specifications in the computer. Fabric specification data such as kinds of warp yarns, thickness of a warp yarn, a warp yarn total number, kinds of weft yarns, weft yarn density, and weaving width are entered in succession.

Given such fabric specifications, the host computer 2 evaluates a standard set value from past accumulation data stored in the accumulation memory Further, basic data and similar data yielded based on past trial weaving and results available from actual weaving are assumed to be previously stored.

Flowcharts illustrating the evaluation of the standard set values executed by the host computer 2 are shown in FIG. 10, while functional block diagrams corresponding to the flowcharts are shown in FIG. 11.

Figure 10A:
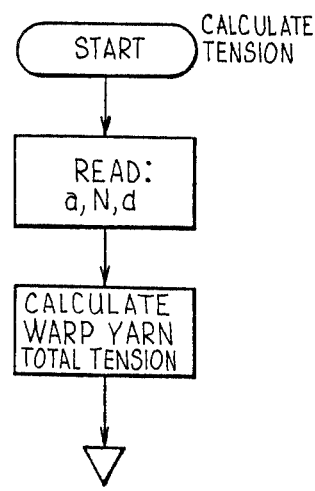
Figure 11A:
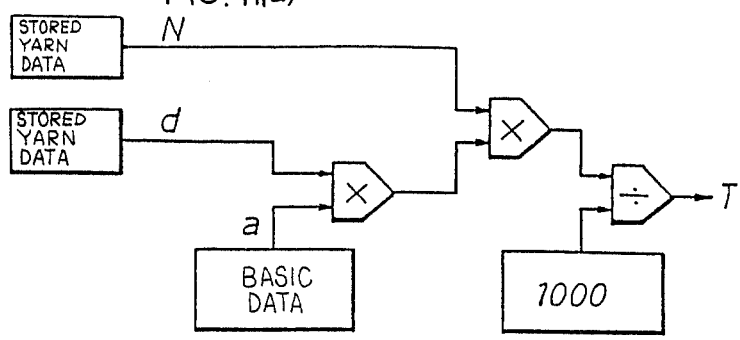

FIGS. 10(a) and 11(a) are respectively the flowchart and the functional block diagram for evaluating the standard warp yarn total tension of value T. Basic data "a" of the same kind is read out from the accumulation data memory 22. Then, using a warp yarn total number N and a warp yarn denier number "D" among fabric specifications entered with use of the keyboard 7, $T = a \cdot d \cdot N/1000$ is calculated to evaluate the warp yarn total tension set value T.

Figure 10B:
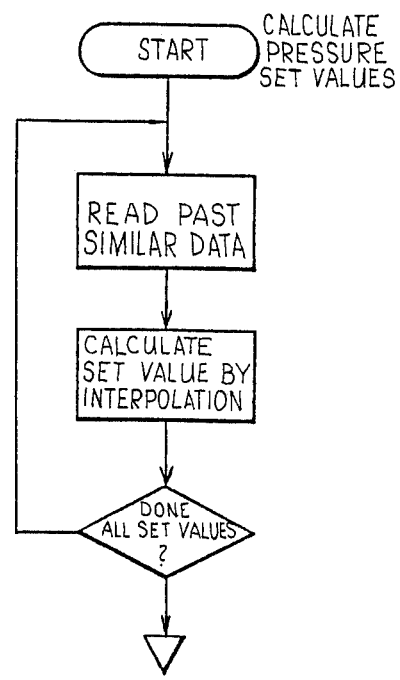
Figure 11B:
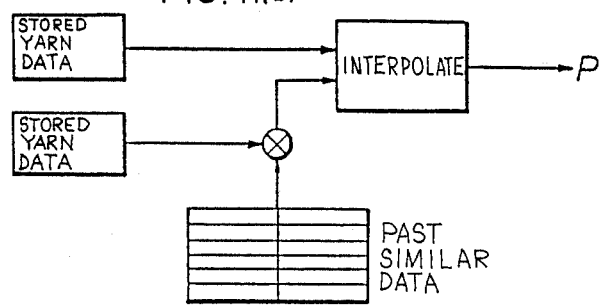

FIGS. 10(b) and 11(b) are respectively the flowchart and the functional block diagram for evaluating a standard pressure (fluid pressure) set value P. A plurality of relationships between weft yarn thicknesses $b_1$, $b_2$, ... and fluid pressures $P_1$, $P_2$, ... as past similar data for the same kind of weft yarns as entered from the keyboard 7 are read out from the accumulation data memory 22 as shown in FIG. 12. And, parameters $b_i$, $b_{i+1}$, $P_i$, $P_{i+1}$ satisfying a relation $b_i < b < b_{i+1}$ for the weft yarn thicknesses entered from the keyboard 7 are estimated. With use of these parameters, an interpolation operation $P = (P_{i+1} - P_i)(b - b_i)/(b_{i+1} - b_i) + P_i$ is executed from a relationship shown in FIG. 13 to evaluate the standard pressure set values P.

Figure 10C:
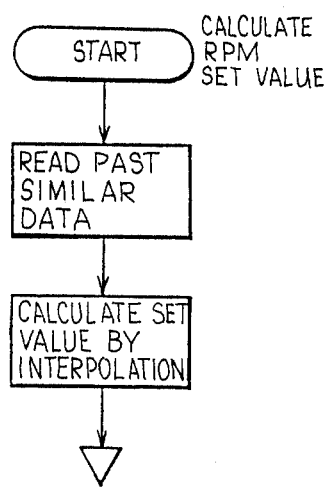
Figure 10D:
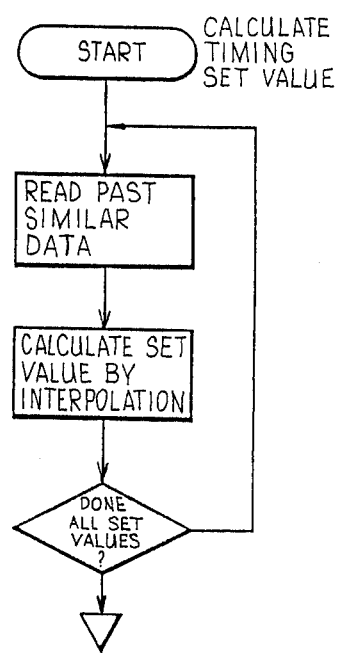
Figure 11C:
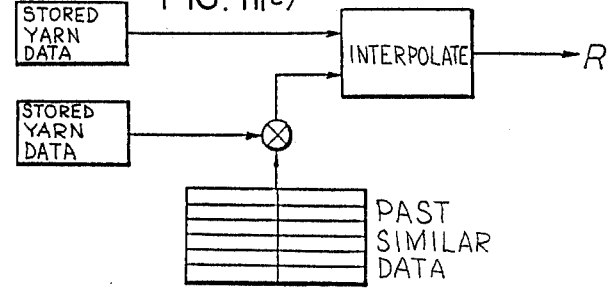
Figure 11D:
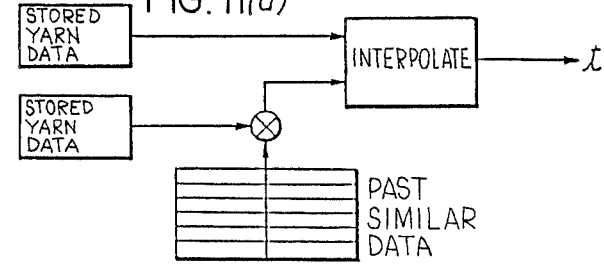

Further, FIGS. 10(c) and 11(c) are of respectively the flowchart and the functional block for evaluating a number-of-RPM set value R. Likewise, FIGS. 10(d) and 11(d) are respectively the flowchart and the functional block for evaluating an on/off timing set value "t" of a nozzle. Also for these cases, using similar data read from the accumulation data memory 22, an interpolation operation is executed to evaluate the respective set values. All the standard set values of various kinds so evaluated are successively transmitted to designated relevant looms 3 as standard set values via the terminal control unit 10 as a communication interface and the bidirectional data bus 4.

Subsequently, FIG. 14 shows a flowchart for illustrating an evaluation process of a number of the control conditions in the order of Steps 1 to 10, in which any step number is shown in parentheses.

Here, a decision process for deciding if the same specifications existed in the past is included in Step 3.

If there existed the same specifications, they are read out of the accumulation data memory 22. Following the operation shown in the flowchart, the respective looms 3, after receiving an operation signal, weave based on the standard set value.

Now, operation for subjecting the looms to the optimal control will be described as follows.

Data associated with respective allowable upper and lower limit reference values of for example (1) the rate of operation, (2) a number of RPM, (3) warp yarn total tension, and (4) fluid pressure are entered through the keyboard after they have been put in an order of priority as optional control reference values. Here, the upper reference value of the rate of operation put in the first order of priority may be not entered. On the other hand, the respective looms 3 (terminal device 13) starting to be operated in accordance with the respective standard set values feed back operation data via the bidirectional data bus 4 and the terminal control unit 10 as the communication interface to the host computer 2.

The host computer 2 compares in succession the operation data fed back from the looms 3 with a plurality of the optimal control reference values entered in the order of priority, and corrects the respective standard set values on the basis of the comparison. Such operation is effected by the set value change means 27 and the set value memory 24 included in the host computer 2.

FIGS. 15 (1), (2) are flowcharts showing exemplary operations of the looms in the optimal control. The operation in conformity with the flow of the flowchart is effected at a prescribed time.

Now, it is assumed that a certain loom 3 for example, is often stopped because warp yarns are broken, and thus does not satisfy the rate of operation thereof being the highest priority reference value, namely, "NO" is decided in Step 1 and "YES" in Step 2. Thereupon, the operation is advanced such that a set value of the warp yarn total tension is reduced within a range wherein the set value is less than the lower limit of the warp yarn total tension which is then in the third order of prior (Steps 3 to 7). However, provided that the rate of the loom operation still does not reach the reference value, the set value of the number of RPM is reduced within a range wherein the set value is not less than the lower limit of the number of RPM being the second order of priority (Steps 8 to 11).

In addition, when the feed of the weft yarn is often stopped due to its breakage and thus does not satisfy the rate of operation being the highest priority reference value, i.e., in case of "NO" in Step 1 and "NO" in Step 2, fluid (air) pressure is increased within a range wherein it is not more than the upper limit of the fluid pressure being the fourth order of priority (Steps 12 to 16). Then, the warp yarn total tension is reduced within a range wherein it is not less than the lower limit of the warp yarn total tension being the third order of priority (Steps 17 to 20 and Step 16).

However, provided that the rate of operation still does not reach the reference value, the number of RPM, the second order of priority, is lowered within a range wherein it is not less than the lower limit thereof (Steps 21 to 24, and 16).

In contrast with the above cases, when the rate of operation is very high, i.e., in case of "YES" in step 1, the number of RPM and the warp yarn tension are increased within a range wherein the rate of operation is not less than the lower limit of the reference value (Steps 25 to 33), and if there is nevertheless no problem, the set value of the fluid (air) pressure is reduced (Steps 35 to 37 and 29). Moreover, in Steps 30 to 33, whether the upper limit value is made to be the optimal one or the lower limit value to be the optimal one is previously entered in the host computer along with the reference values. Here, high tension is made optimum.

FIG. 16 is a block diagram showing an example of a centralized control apparatus according to the present invention.

The fabric specification input means 28 has the key board 7, the display 6, a fabric specification input circuit 29 for entering fabric specification data from the keyboard 7, a machine number input circuit 30 for entering a loom number, and a fabric specification memory 31 for storing a fabric specification data.

The accumulation data memory 22 includes a similar item/interpolation data memory 32, a data read circuit 33 for reading data available from the above latter memory 32, a data write circuit 34 for writing data, a data memory 35 for storing arithmetic operation basic data such for example as tension/denier, and a write circuit 36 for writing basic data in the memory 35.

The set value evaluation means 23 has a coincidence circuit 37 for deciding whether any same specification standard set value exists in the accumulation data memory 22 based on the data from the fabric specification memory 31, a memory 38 for storing arithmetic operation items, a memory 39 for storing similar interpolation items, an evaluation method selection circuit 40 for selecting a proper evaluation method based on data from the above respective memories 38, 39 and data from the fabric specification memory 31, an arithmetic circuit 41 for effecting prescribed arithmetic operations on the basis of a signal from the selection circuit 40, a similarity decision circuit 42, a similar data memory 43 for storing similar data derived from the similarity decision circuit 42, and an interpolation arithmetic circuit 44 based on a signal from the similarity data available from the similarity data memory 43.

In addition, the set value memory 24 comprises various memories for storing data associated with fabric specifications, loom numbers, and respective standard set values evaluated in the arithmetic circuit 41 and the interpolation operation circuit 44. Moreover the set value transmitting means 25 has a scanning signal generator 45, a loom number transmitting circuit 46, a set value transmitting circuit 47 for transmitting the respective standard set values stored in the set value memory 24, and an output channel 8 connected with the bidirectional data bus 4, and standard set values transmitted therefrom are received by the terminal unit 13 for transmission/reception located on the loom side.

The operation data receiving means 26 comprises an input channel 49 and an operation data input circuit 50 for inputting operation data from the looms 3 via the input channel 49 and the bidirectional data bus 4. Moreover, the set value change means 27 comprises a decision standard input circuit 51 for entering a decision standad value from the fabric specification input means 28, a decision reference memory 52 for storing the above decision reference value, an operation quality decision circuit 53 for receiving a reference value and an operation data and thereby deciding operation quality, and a set value correction circuit 54 for correcting the respective standard set values stored in the set value memory 24 based on the decision result available from the operation quality decision circuit 53. Moreover, the respective corrected standard set values are stored in the accumulation data memory 22 as fabric specification standard set values corresponding thereto on the basis of the decision result by the operation quality decision circuit 53.

Although, in the above embodiments, the accumulation data memory 22 is supposed to be an external memory such as a floppy disk, it may be one porfitably employing a semiconductor memory such as a batter-backed-up random access memory (RAM) contained in the host computer.

Fourth Embodiment

A fourth embodiment will be now described, wherein a method is given which enables data on a newly woven fabric to be automatically transferred to the control units of respective looms and thereby control data for the next fabric to be woven to be set although the looms are presently weaving another fabric.

Namely, in the this embodiment, control data classified by kinds of fabrics are stored beforehand in the memory 9 of the centralized control apparatus 1, and a style number scheduled for the next weaving is made to wait as a queue for every loom. Thereby, control data for the next woven fabric are read in order based on warp-out signals from the respective looms 3, and transferred to the control units 11 of the respective looms 3, whereby the corresponding looms 3 are continuously operated. Control data for the succeeding woven fabrics are previously stored in the memory 9 as the queue. Accordingly, preparing works for the respective looms 3 can be effectively conducted without the need of data input each time.

FIG. 17 shows the arrangement of the host computer 2 for putting the present embodiment into practice. A control parameter setting unit 55 is connected with the memory 9 via a gate 56 for determining values for weaving conditions. In addition, a style number setting unit 57 is connected with the memory 9 via an gate 58 and a upper decoder 59 for setting a style number representative of a group of weaving conditions in response to kinds of fabrics. Furthermore, a setting unit 60 for setting style numbers on and after the next weaving time is connected with an upper decoder 59 via a plurality of queue registers $8_1 \ldots 8_n$ corresponding to the respective loom numbers and a gate 62. In addition, a loom number setting unit 63 is connected with a common latch input terminal of the respective queue registers $8_1 \ldots 8_n$ via a gate 64 and a loom number decoder 65, and further via one input terminal of each of a plurality of AND gates 66. Moreover, a set pulse generator 67 is connected with the other input terminal of each of serveral an AND gates 69 via a gate 68. Still more, a set pulse generator 70 is connected directly with the memory 9 via a gate 71 while it branches after the gate 71 and is connected with the memory 9 via one of the input terminals of an OR gate 72 through an address updating counter 73 and a lower decoder 74.

By contrast, a reference pulse generator 96 is connected with the other of the input terminals of the OR gate 72 via a gate 75 and a read pulse train generator 76, while it branches on this side of the gate 75 to a gate 77, a scanning counter 78, and a decoder 79 and is connected with a multiplexer 80. The reference pulse generator 96 further branches and is connected with the loom number decoder 65 via a gate 82. Still more, the pulse train generator 76 is also connected via its other output terminal with clear input terminals of the queue registers $8_1 \ldots 8_n$ and a reset input terminal of a flip-flop 84 via a plurality of AND gates 83. The multiplexer 80 is connected with a set input terminal of the flip-flop 84. One output terminal of the flip-flop is connected with a gate 82, while the other output terminal is connected with respective input terminals of a gate 75 and several AND gates 85, and with the gate 77 through a NOT gate 86 and with the gates 56, 58, 61, 68, 64, 71 through a NOT gate 87.

Then, FIG. 18 shows the internal arrangement of the terminal device 13 which has a plurality of latches 88 and a decoder 89. The plurality of the latches 88 store data such as a number of RPM of a loom prime motor and a number of times of yarn bearings, or warp yarn tension received via a waveform shaper 90, and deliver them to a loom control circuit 91. Moreover, the decoder 89 receives a selection item code from the waveform shaper 92 and operates the latch 88 corresponding to the code. Here, a warp-out contact 93 of the loom control circuit 91 is connected with the multiplexer 80 via a NOT gate 94 and an amplifier 95.

Now, an exemplary control data transfer will be described.

Since the flip-flop 84 has not been set with all the looms 3 out of a warp-out state, the gate 82 remains opened due to the one output of the flip-flop 84 and the gates 56, 58, 61, 68, 64, 71, 77 remain opened because of the NOT gates 86, 87 due to the other output of the flip-flop 84.

Meanwhile, a style number selects upper addesses in the memory 9 via the upper decoder 59 by the style number setting unit 57 in order to set weaving conditions of a certain fabric.

With this situation, control parameters such as a number of RPM of the prime motor, a number of times of yarn beatings, and warp yarn tension are successively stored in the memory 9 based on memory timing pulses issued from set pulse generator 70 in order to set the control parameters, i.e., weaving conditions. A memory address in this case is determined without ambiguity by an upper address defined by the style number and a lower address defined by the counter 73 via the lower decoder 74. The lower address can be updated by the counter 73 and the lower decoder 74. In such a manner, the memory stores control parameters for every style number carried thereon.

In addition, the succeeding style numbers are stored in the queue registers $8_1 \ldots 8_n$ corresponding thereto via the setting unit 60 synchronized with the successive set pulses from the set pulse generator 67. The above operation for specifying the queue registers $8_1 \ldots 8_n$ is performed by the loom number setting unit 63 and the loom number decoder 65.

Thus, the next style number is previously stored in the queue registers $8_1 \ldots 8_n$.

In such a weaving operation, provided that weaving of a certain loom 3 is completed, the corresponding warp-out contact 93 is closed, so that a warp-out signal is provided to the multiplexer 80 via the terminal device 13. Hereby, the flip-flop 84 changes to a set state and scanning effected by the loom number decoder 65 is stopped. In the set state of the flip-flop, the gates 56, 58, 61, 68, 64, 71, 77 are set to a closed state, while the gate 75 is opened . Therefore, an output pulse from the reference pulse generator 96 is provided to the read pulse train generator 76. On the contrary, since the one input terminal of the AND gate 85 is at an "H" level, the corresponding gate 62 is opened by a signal from the loom number decoder 65. Then, the upper decoder 59 of the memory 9 receives the next style number concerning the loom 3 in the warp-out state from the queue registers $8_1 \ldots 8_n$ corresponding to the warp-out loom 3, and a control parameter having the above style number is transferred to the corresponding loom 3 via the multiplexer 80. As described above, provided that the warp-out signal concerning a certain loom 3 is produced, the host computer 2 reads out the next style number from the corresponding queue registers $8_1 \ldots 8_n$ and automatically transfers a control parameter corresponding to that style number via the multiplexer 80. Accordingly, in the warp-out state, the next preparation for weaving can be automatically effected without requiring new designation of the style number.

Although in the above embodiment, the queue registers $8_1 \ldots 8_n$ are provided for storing the next style number, a further long queue may be formed with use of a microprocessor to store many style numbers. Hereby, style numbers on and after the next time can be stored to further improve system performance.

Fifth Embodiment

Now, a fifth embodiment will be described below. The embodiment provides a method for realizing the optimal control for looms in which control data for weaving required for actual operation of respective looms can be simply transferred from a central control unit to control units of the respective looms while yarn information can be also delivered to the control units of the respective looms.

According to the present embodiment, control data for weaving for every fabric style are previously stored in the memory 9 of the host computer 2 in correspondence with the style number, and upon changing the fabric style of each loom the style number is designated, whereby all the control data required for the weaving can be read out of the memory 9 and immediately transmitted to the control units 11 of the corresponding looms 3. In addition, in order to profitably employ yarn information in the weaving, information of yarns needed for the weaving in silk reeling processes is also stored simultaneously with that of beam numbers and lot numbers, and upon changing warp yarn beams and weft yarn cones information thereof is entered in the control device 11 of the loom 3. Thus, the present invention can realize the optimal operation state for every loom 3 in response to the yarn information.

Now, operation of the present embodiment will be described.

The host computer 2 incorporates therein control data required for the control units 11 of the respective looms 3 by a control program based on control, arithmetic operation, and memory functions of the CPU 5, and stores them in the memory 9. The host computer 2 further transfers required control data through the data bus 4 on the basis of a request from the control device 11 of each loom 3.

Such control data are entered in the host computer 2 via the keyboard 7 and prepared while checking them with the display 6, and thereafter stored in the memory 9 together with a style number unique to a fabric style. In such a manner, weaving condition data, such for example as a number of RPM of a loom, a number of times of weft beatings per unit length, warp tension in weaving, on/off timing of a nozzle for weft insertion, pressure setting of air for weft insertion, and others, are prepared beforehand for every style number, i.e., for every fabric style, and thereafter stored in the memory 9. Thus, designation of any control data thereafter can be simply effected only by specifying a style number in interest.

In addition, contents of the control data so set can be changed at need, and in order to realize the optimal conditions can be altered each time of actual weaving or trial weaving.

FIG. 19 shows a procedure in changing internal control data for every style number. With selection of "style change" by an operator through the keyboard 7, a program needed to change a fabric style is automatically started. Designating here a style number to be changed, the CPU 5 reads out the designated style number from the memory 9 and displays it on the display 6. Hereupon, an operator selects an item to be changed from the above control data and changes its numerical value to a needed one. Thereafter, the CPU 5 newly stores in the memory 9 the changed control data as style number data.

By contrast, yarn information is stored in the memory 9 together with a warp yarn beam number and a weft yarn cone lot number. Such a beam number and a lot number are previously written in a beam and a cone in a preparation stage of weaving. Warp yarn information is representative of the total length of a yarn, a beam outer diameter or bad yarn information such as fluffing, siges, unevenness, or yarn break in a pre-process, e.g., in a sizing process. In addition, weft yarn information is representation of, besides bad yarn information such as yarn break in yarn manufacture, a yarn lot, yarn length, and yarn thickness.

In such a manner, the host computer 2 stores style numbers each specifying control data, beam numbers each specifying warp yarn information, and lot numbers for specifying weft yarn information as a queue for every loom number as a series of starting data, in the external memory 9 of the CPU 5.

Then, FIG. 20 shows the order of operation by a centralized control apparatus of the present embodiment.

The centralized control is executed by a centralized control program contained in the CPU 5. First, the CPU 5, upon receiving a command of starting the centralized control, starts its control, designates a loom number, e.g., "1", and receives weaving information data from the terminal unit 13 of the loom 3 control device 11. The terminal unit 13 provides data needed to control the corresponding loom and delivered from the host computer 2 to the loom control device 11, and meanwhile accepts a signal representative of weaving information from the corresponding loom, temporarily stores the signal, and transfers it to the host computer 2 at the time of receiving a data transfer command from the host computer 2.

The CPU 5 decides here the presence of a data request by the control device 11 of the loom 3 based on the above reception data. If the control device 11 requests any data, the CPU 5 designates the style number of the data, a warp yarn beam number, and a weft yarn let number, whereby reads out control data and yarn information corresponding to the above numbers, and transfers them to the corresponding terminal device 13 through the terminal control unit 10 and the data bus 4. The terminal device 13 here temporarily stores the transferred control data and yarn information data, and transmits them to the control unit 11 of the corresponding loom 3 which then holds the above data as required for loom operation to conduct necessary control based on the above data. Here, yarn information, particularly bad yarn data, is profitably employed to temporarily set a speed of loom revolutions to a lower value in the vicinity of a bad portion of the yarn.

By contrast, the CPU 5 reads the next loom number, e.g., "2", and conducts the same processing as before therefor.

In such a processing process, when there is no request for control data from the control unit 11, the CPU 5 branches from a data transfer routine, enters a registering routine, and decides the presence of style registering, beam registering, and lot number registering, in order.

When the style number registering is requested and a registable state is reached, an operator first enters the style number and control data corresponding to the above style number, and commands data registering. With such operation, the host computer 2 stores the control data for each style number.

In addition, when a beam registering or a lot registering is requested and a registable state is reached, an operator enters first a loom number, then a style number, and finally a beam number corresponding to the style number, yarn information thereof, a cone number corresponding to the style number, and weft yarn information thereof. Furthermore, the operator stores the above information in the external memory 9, which registers the style number and beam number, and a lot number in the external memory 9 as starting data of the corresponding loom.

In such a manner, the host computer 2 enters the loom number and style number corresponding thereto, the beam number, and lot number as starting data for all the looms 3, and registers them therein.

Then, FIG. 21 shows another form of the centralized control described above.

First, the CPU 5, after starting the centralized control, decides the presence of a control data transfer request from the control unit 11 of the loom 3. For example, when there is a transfer request from the control unit 11 of the loom 3, the CPU 5 starts a data transfer routine. In the first place, the CPU 5 decides whether the data for which transfer is requested is control data for a style or not, and if not, advances forward the next step to transfer needed yarn information. But, when control data are requested because for a the need of style change, the CPU 5 searches using a number of the next starting style, reads needed control data from the above number and transfers it, and thereafter transfers yarn information of a warp yarn beam number and a weft yarn lot number to the control unit 11 of the loom 3. Such operation is repeated also for the other control units 11, whereby the host computer 2 controls the control unit 11 of all the looms.

When there is no data transfer request at the above check for the presence of the control data transfer request, the CPU 5 enters a registering routine and decides the presence of style registering, yarn information registering, and transfer order registering from an operator. When a style registering command is provided to the CPU 5 to permit an operator to newly enter control data corresponding to a style number, a step of style registering is started. The operator, after registering a style number, enters in succession control data corresponding to the above style number. Thus, all the control data are registered. At the time of the end of such style registering, the control program again returns to the first step.

Moreover, when the operator requests yarn information registering, the CPU 5 starts this program. The operator, after registering a beam number and a lot number, enters in succession yarn information of warp and weft yarns. The control program again returns to the first step after all the needed information is entered.

When the operator requests registering of the transfer order, the centralized control apparatus 1 starts its steps. Then, the operator, after specifying the loom number, designates the transfer order based on the weaving order of the associated loom and simultaneously enters the style number. The operator further enters in succession a corresponding beam number and lot number. In such manner, when a style number to be weaved, a warp yarn beam number and a weft yarn cone lot number at that time, etc., are specified for a control unit 11 of a certain loom 3, the transfer order is provided and entered. Accordingly, in the present program, various data can be entered even if it is not specified to which loom 3 a warp yarn beam and a weft yarn cone should be supplied. This is advantageous to prepare starting data when the above information is specified.

Although certain preferred embodiments have been shown and described, it should be understood that many changes and modifications may be made therein without departing from the scope of the appended claims.

What is claimed is:

1. A centralized control method for a system having a host computer connected with a plurality of looms, comprising the steps of:
   (a) switching a selected said loom from an on-line state in which it is controlled by said host computer to an off-line state in which it is controlled by an adjustable setting unit therein, and then causing said selected loom to carry out trial weaving while adjusting said setting unit in order to estimate the optimal control conditions for weaving with said selected loom,
   (b) thereafter storing said estimated optimal control conditions from said setting unit of said selected loom in said host computer,
   (c) transmitting thereafter said optimal control conditions stored in said host computer to a group of said looms other than said selected loom, and
   (d) operating each said loom in said group based on said optimal control conditions.

2. A centralized control method according to claim 1, including the steps of switching one of said group of looms to its off-line state, utilizing a setting unit thereof for selecting specific control conditions for said one of said group of looms, thereafter storing said specific control condtions in said host computer as specific conditions unique to said one of said group of looms, thereafter switching said one of said group of looms to its on-line state, and thereafter transmitting said specific control conditions from said host computer to said one of said group of looms in lieu of said optimal control conditions.

3. A centralized control method for a system having a host computer and a plurality of looms controlled by control data from said host computer, said method comprising the steps of:
   (a) registering in said host computer a plurality of style numbers identifying respective fabrics and registering for each said style number a set of standard control data representative of respective fabric specifications,
   (b) preparing for one said loom and a particular said style number a set of corrected control data different from said standard control data in order to compensate for loom characteristics peculiar to said one loom, (c) associating said particular style number and a number identifying said one loom with said corrected control data and registering in said host computer said corrected control data and said associated style number and identifying number, (d) causing said host computer to determine, when one of said style numbers is designated for said one loom, whether corrected control data associated with said identifying number for said one loom and with said designated style number is registered in said host computer, (e) causing said host computer to transfer to said one loom said corrected control data for said one loom and for said designated style number if registered in said host computer, and (f) causing said host computer to transfer said standard control data for said designated style to said one loom when said host computer determines there is an absence of a registration of corrected control data associated with said designated style number and with said one loom.

4. A centralized control method for a system which includes a host computer, a memory connected with said host computer, and a plurality of looms controlled by an operation signal from said host computer, said method comprising the steps of:

(a) accumulating during system operation accumulation data which includes fabric specifications for respective fabrics and includes set values which will cause a loom to weave each such fabric, and storing said accumulation data in said memory, (b) causing said host computer to decide, when fabric specifications for a new fabric to be woven by a certain said loom are entered into the host computer, whether said accumulation data includes similar fabric specifications, (c) causing said host computer to read, if stored in said memory, said accumulation data for similar fabric specifications and to use it in a predetermined mathematical operation to estimate, from said fabric specifications for said new fabric, standard set values for said new fabric; and (d) causing said host computer to transmit said standard set values for said new fabric to said certain loom as said operation signal therefor.

5. A centralized control method according to claim 4, wherein said standard set values estimated by said host computer include numbers of RPM for loom prime motors, and warp yarn total tension.

6. A centralized control method according to claim 4, wherein said standard set values estimated by said host computer include on/off timing control and fluid pressure for nozzles used for weft insertion.

7. A centralized control method according to claim 4, including the steps of:

(a) transmitting from each said loom to said host computer operation data representative of the present operational efficiency of each said loom, and causing said host computer to compare the operation data from the looms, which are starting to operate under said standard set values, with reference values previously entered in said host computer, and (b) causing said host computer to prepare and transmit to one of said looms corrected set values when said comparison results indicate said operation data from said one loom is below said reference values.

8. A centralized control method according to claim 7, wherein said reference values include a rate of loom operation and warp yarn total tension.

9. A centralized control method according to claim 7, wherein said reference values include a fluid pressure.

10. A centralized control method according to claim 7, wherein said operation dta from each loom indicates how many times the loom has stopped due to broken warp yarns and broken weft yarns.

11. A centralized control apparatus for a plurality of looms, comprising:

(a) fabric specification input means for entering fabric specifications, (b) means for accumulating during loom operation accumulation data which includes fabric specifications for respective fabrics and includes set values which cause a loom to weave each such fabric, and accumulation data memory means for storing said accumulation data, (c) set value evaluation means for using accumulation data from said accumulation data memory means in a predetermined mathematical operation to estimate, from fabric specifications entered from said fabric specification input means, standard set values to be used for loom control, (d) set value memory means for storing said standard set values from said set value evaluation means, (e) set value transmitting means for transmitting said standard set values to a plurality of the looms, (f) operation data receiving means for receiving from each said loom operation data representative of present operational efficiency of each said loom, and (g) set value change means for preparing and storing in said set value memory means corrected set values in response to operation data received by said operation data receiving means from one of said looms and indicating inefficient operation of said one loom, said set value transmitting means thereafter transmitting said corrected set values to said one loom in lieu of said standard set values.

* * * * *